United States Patent [19]
Müller et al.

[11] Patent Number: 5,138,902
[45] Date of Patent: Aug. 18, 1992

[54] ROTARY VIBRATION DAMPER

[75] Inventors: Klaus Müller, Birkenau; Peter Schwibinger, Hirschberg; Rainer-Horst Andrä, Limburg, all of Fed. Rep. of Germany

[73] Assignee: Firma Carl Freudenberg, Weinheim/Bergstrasse, Fed. Rep. of Germany

[21] Appl. No.: 601,854

[22] Filed: Oct. 22, 1990

[30] Foreign Application Priority Data

Nov. 11, 1989 [DE] Fed. Rep. of Germany ....... 3937669

[51] Int. Cl.$^5$ ............................................. F16F 15/10
[52] U.S. Cl. ........................................ 74/574; 464/83; 464/180; 192/106.1
[58] Field of Search ...................... 74/574; 301/6 WB; 188/136, 141; 192/106.1; 464/180, 83, 87

[56] References Cited

U.S. PATENT DOCUMENTS

| | | | |
|---|---|---|---|
| 1,862,140 | 6/1932 | Guy | 464/83 X |
| 3,386,264 | 6/1968 | Paulsen | 464/83 X |
| 4,734,079 | 3/1988 | Viets | 74/574 X |
| 4,779,483 | 10/1988 | Andra et al. | 74/574 |
| 4,914,949 | 4/1990 | Andra et al. | 74/574 |

FOREIGN PATENT DOCUMENTS

| | | | |
|---|---|---|---|
| 2933586 | 2/1981 | Fed. Rep. of Germany | 464/180 |
| 3314502 | 10/1984 | Fed. Rep. of Germany | 74/574 |
| 3529687 | 3/1987 | Fed. Rep. of Germany | 74/574 |
| 3535286 | 4/1987 | Fed. Rep. of Germany | . |

Primary Examiner—Leslie A. Braun
Assistant Examiner—Winnie Yip
Attorney, Agent, or Firm—Sprung Horn Kramer & Woods

[57] ABSTRACT

A rotary vibration damper for a shaft where the flywheel ring 1 and the hub 2 are connected by first resilient elements 3 uniformly distributed in the circumferential direction, and where second resilient elements 4 of an essentially column-like shape are provided between the first resilient elements 3. The second resilient elements are affixed at one end to the hub 2 and at the other end to the flywheel ring 1. When the rotary vibration damper does not rotate, these elements have a bend 7 in the intermediate zone which protrudes radially inward. This bend 7 can be reduced and eventually eliminated at higher speeds by centrifugal forces, thus causing the spring rigidity to increase.

6 Claims, 1 Drawing Sheet

ROTARY VIBRATION DAMPER

BACKGROUND OF THE INVENTION

The invention relates to a rotary vibration damper for a shaft where first resilient elements, uniformly distributed in the circumferential direction, connect the flywheel ring to the hub and where second resilient elements of an essentially column-like shape are provided between the first resilient elements. With their one end, these second resilient elements are affixed to the flywheel ring and, at a freely selectable, higher rotational speed, these second resilient elements are switched parallel to the first resilient elements due to the centrifugal forces acting upon them.

A rotary vibration damper of this type is known from the German Published Patent Application No. 3,535,286 where each second resilient element includes two partial elements that overlap in the radial direction. These partial elements are configured as one-side levers and, at a prescribed rotational speed, they can engage one another due to the centrifugal forces and can be switched parallel to the first resilient elements. The balance error of this rotational vibration is less than fully satisfactory and its long-term service life is less than sufficient.

SUMMARY OF THE INVENTION

The principal object of the present invention is to further develop a rotary vibration damper of the aforementioned type so as to improve its balancing properties and service life.

This object, as well as further objects which will become apparent from the discussion that follows, are achieved, in accordance with the invention, by providing a rotary vibration damper with second resilient elements which essentially extend in the circumferential direction. The two ends thereof are affixed, one to the flywheel and the other to the hub. They are thus well guided and protected from unacceptably large deformations which may result in known embodiments when high rotational speeds are reached. This is of great advantage in order to achieve a good service life.

When the rotary vibration damper is not in operation, the second resilient elements, between the so affixed ends, are provided with a bend pointing in the direction of the rotational axis. During a rotational speed in the lower range, these bends are largely maintained and impart a high degree of softness to the second resilient elements. The rotationally elastic support of the flywheel ring is thus significantly determined by the spring elasticity of the first resilient element.

With an increase in the rotational speed, the bends of the second resilient elements are increasingly eliminated by the centrifugal forces acting thereupon. The second resilient elements are thus gradually transformed into an straightened configuration which is under elastic prestress between the two ends. The rigidity of the spring increases correspondingly and, at a freely selectable rotational speed, it reaches a value that significantly accounts for the circumferential-elastic support of the flywheel ring. The resonance frequency of the flywheel ring is subject to a corresponding shift permitting good damping action over a large frequency range. Balance problems are thus largely avoided.

Advantageously, the second resilient elements and the first resilient elements are associated with one another in an essentially mirror-inverted relationship. The proposed rotary vibration damper can act independently of the direction of rotation, which is of great advantage for both its manufacture and its use.

In the area of their ends affixed to the flywheel ring, the second resilient elements and the first resilient elements can be configured such that they join one another. This simplifies the manufacture and, in the case of high speeds, permits generating an elastic prestress in the first resilient elements in addition to the second resilient elements. This possibility is of great advantage, particularly with respect to avoiding balance problems at high speeds.

At both of their sides, the second resilient elements can have end pieces which, spaced apart from the rotational axis at essentially the same distance, are affixed to the flywheel ring on the one side and to an externally pointing protrusion of the hub on the other side. The effect made use of in accordance with the invention, which is the centrifugal transformation of an initially inwardly bent spring into the shape of a column-like spring, is particularly clear in this case.

In the area of its bend, each second resilient element can be provided with an additional weight to eliminate this bend at a comparatively small rotational speed. The additional weights can be replaceably attached to allow a subsequent adjustment of the vibration damper to special requirements of use.

The proposed rotational vibration damper can be referred to as self-adjusting to rotational speed and amplitude. It is particularly suitable for use in the drive train of a motor vehicle.

BRIEF DESCRIPTION OF THE DRAWING

The single figure is a front view of a preferred embodiment of the rotary vibration damper in accordance with the invention.

DESCRIPTION OF THE PREFERRED EMBODIMENT

Figure 1:
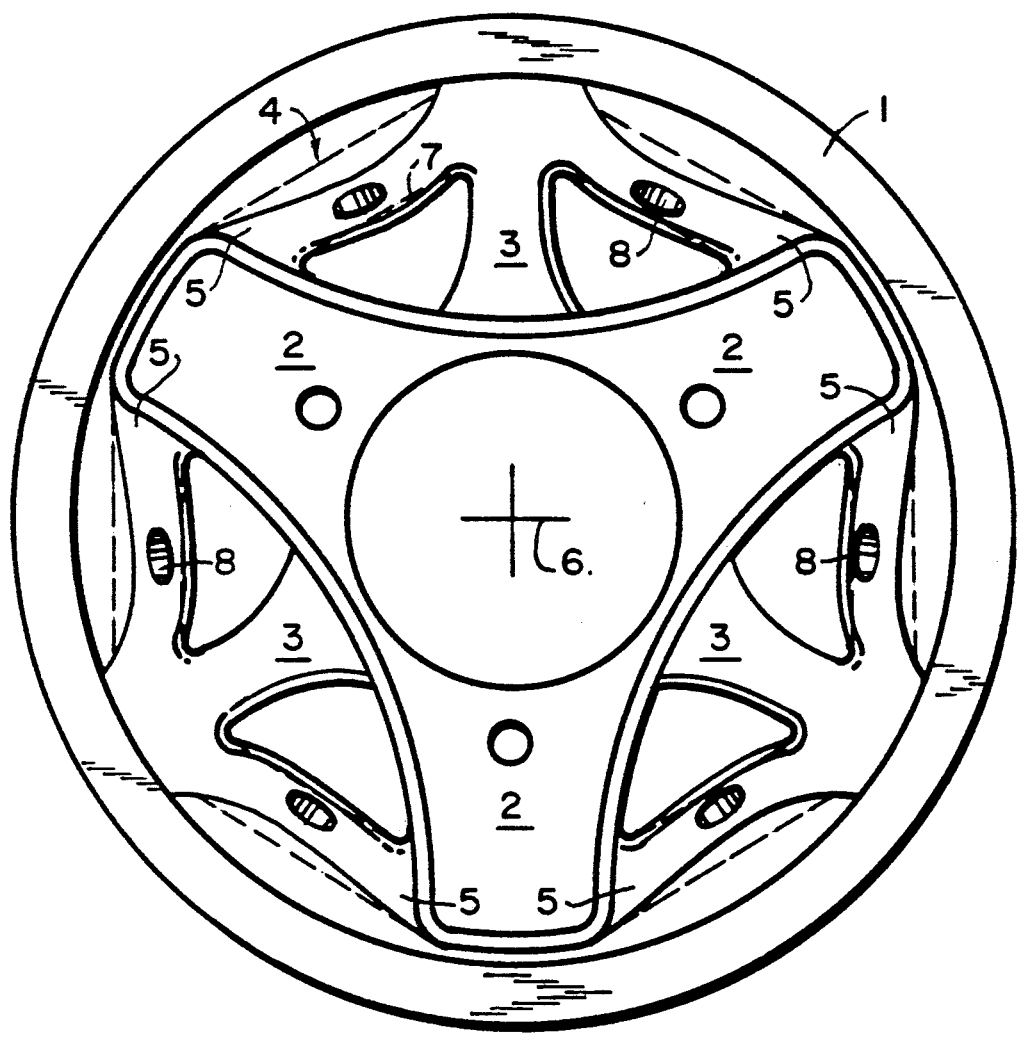

The rotary vibration damper represented in the figure is intended for use on the cardan shaft of a motor vehicle. The flywheel ring 1 and the hub 2 are connected by first resilient elements 3 which are uniformly distributed in the circumferential direction. Second resilient elements 4 of an essentially column-like shape are provided between the first resilient elements 3. The second resilient elements have end pieces 5 on both sides which, essentially spaced identically apart from the rotational axis 6, are affixed to protrusions of the hub 2 which radially point toward the exterior on the one hand, and to the first resilient elements 3 on the other hand. Via the latter, these second resilient elements are affixed to the flywheel ring 1. They thus essentially extend in circumferential direction.

The second resilient elements 4 are configured such that, when the vibration damper does not rotate, a bend 7, which is pointed in direction of the rotational axis 6, is present in the intermediate zone between the end pieces 5 thereof. Because of the centrifugal forces that act upon the second resilient elements 4, this bend is increasingly reduced with increasing rotational speeds, resulting in an increasing straightness in the shape, as indicated by dashed lines in the figure. The initially very great softness in circumferential direction and the elastic resilience are thus gradually converted into a greater spring rigidity which overrides and easily dominates the effect of the respective first resilient elements 3. The circumferential elasticity with which the flywheel ring 1 is supported on the hub 2 is thus subject to an increasing rigidity which in turn changes its resonance frequency. This results in a good vibration damping over a large speed range.

The first resilient elements 3 and the second resilient elements 4 are associated with one another in a mirror-inverted relationship. The represented rotary vibration damper can therefore act independently of its rotational direction of motion. The support of the second resilient element 4 on the radially inside surface of the flywheel ring 1, which results when the maximum speed is reached, protects the damper from unacceptably great deformations of the second resilient elements, a fact which leads to a good service life. At the same time, a part of this support effect is transferred to the first resilient elements 3. In the area of their circumferential direction, these first resilient elements are configured as one piece with (thus integrally joining) the second resilient elements 4. The second resilient elements 4 therefore provide for a certain form-fixed position of the first resilient elements 3 in the circumferential direction, when the vibration damper attains higher speeds.

The second resilient elements 4 have axial openings in the area of their bends 7. The additional masses 8 of a freely selectable weight can be subsequently pressed into these openings. The beginning of the elastic deformation can thus be shifted to a lower rotational speed such that the damping effect to suppress rotational vibrations can be used in an enlarged speed range.

There has thus been shown and described a novel rotary vibration damper which fulfills all the objects and advantages sought therefor. Many changes, modifications, variations and other uses and applications of the subject invention will, however, become apparent to those skilled in the art after considering this specification and the accompanying drawing which disclose the preferred embodiment thereof. All such changes, modifications, variations and other uses and applications which do not depart from the spirit and scope of the invention are deemed to be covered by the invention, which is to be limited only by the claims which follow.

What is claimed is:

1. A rotary vibration damper comprising:
   (a) a shaft having a central rotation axis;
   (b) a hub attached to the shaft for rotation therewith, said hub having a radially inner first portion surrounding said hub and a plurality of radially outwardly extending second portions uniformly distributed in the circumferential direction;
   (c) a flywheel ring radially spaced from the outwardly extending second portions of said hub;
   (d) a plurality of first resilient elements, uniformly distributed in the circumferential direction interconnecting the hub and the flywheel ring; and
   (e) a plurality of second resilient elements fixedly secured to and interconnecting the outwardly extending second portions of the hub and the flywheel ring, each said second resilient element being essentially elongated in shape and having a pair of opposite ends, one of said ends being connected to said outer portion of said hub and the other of said ends being connected to said flywheel, the elongated shape of each second resilient element being substantially bent between said ends, said bend extending inwardly toward the rotational axis, whereby the bends in said second resilient elements are substantially eliminated by centrifugal forces when said vibration damper rotates at an elevated speed, to thereby increase the rigidity of said vibration damper.

2. The rotary vibration damper in accordance with claim 1, wherein the second resilient elements are associated with first resilient elements in an essentially mirror-inverted relationship.

3. The rotary vibration damper in accordance with claim 1, wherein the second resilient elements and the first resilient elements join one another in the area of their ends that are affixed to the flywheel ring.

4. The rotary vibration damper in accordance with claim 3, wherein the second resilient elements include end pieces which are spaced substantially identically apart from the rotational axis, said end pieces being affixed to an externally directed protrusion of the hub, on the one side, and to the first resilient elements, on the other side.

5. The rotary vibration damper in accordance with claim 1, wherein at least some of the second resilient elements have additional weights disposed in the region of their bends.

6. The rotary vibration damper defined in claim 1, wherein said first resilient elements are fixedly secured to said inner first portion of said hub.

* * * * *